(12) United States Patent
Badding et al.

(10) Patent No.: US 7,803,494 B2
(45) Date of Patent: Sep. 28, 2010

(54) STRESS REDUCING MOUNTING FOR ELECTROLYTE SHEET ASSEMBLY IN A SOLID OXIDE FUEL CELL

(75) Inventors: Michael Edward Badding, Campbell, NY (US); Jeffrey Earl Cortright, Corning, NY (US); John David Helfinstine, Big Flats, NY (US); Thomas Dale Ketcham, Big Flats, NY (US); Scott Christopher Pollard, Big Flats, NY (US); Irene M. Slater, Milton, VT (US); Dell Joseph St Julien, Watkins Glen, NY (US); Sujanto Widjaja, Corning, NY (US)

(73) Assignee: Corning Incorporated, Corning, NY (US)

( * ) Notice: Subject to any disclaimer, the term of this patent is extended or adjusted under 35 U.S.C. 154(b) by 1235 days.

(21) Appl. No.: 11/233,679

(22) Filed: Sep. 23, 2005

(65) Prior Publication Data

US 2007/0072043 A1 Mar. 29, 2007

(51) Int. Cl.
*H01M 8/02* (2006.01)
*H01M 8/12* (2006.01)
(52) U.S. Cl. .......................... 429/463; 429/479
(58) Field of Classification Search .......... 429/30, 429/31, 32, 33
See application file for complete search history.

(56) References Cited

U.S. PATENT DOCUMENTS

| | | | |
|---|---|---|---|
| 5,089,455 A * | 2/1992 | Ketcham et al. | 501/104 |
| 5,273,837 A * | 12/1993 | Aitken et al. | 429/30 |
| 5,519,191 A | 5/1996 | Ketcham et al. | 219/552 |
| 6,623,881 B2 * | 9/2003 | Badding et al. | 429/30 |
| 6,852,436 B2 | 2/2005 | Badding et al. | 429/32 |
| 2001/0044041 A1 * | 11/2001 | Badding et al. | 429/32 |
| 2003/0096147 A1 * | 5/2003 | Badding et al. | 429/30 |
| 2004/0197636 A1 * | 10/2004 | Couse et al. | 429/38 |

* cited by examiner

*Primary Examiner*—Dah-Wei D Yuan
*Assistant Examiner*—Maria J Laios
(74) *Attorney, Agent, or Firm*—Svetlana Z. Short

(57) ABSTRACT

A stress reducing mounting for an electrolyte sheet assembly in a solid electrolyte fuel cell is provided that includes a support frame or manifold having an inner edge portion that supports a peripheral portion of the sheet assembly, a seal that affixes an edge of the peripheral portion to the frame or manifold, and a stress reducer disposed around the peripheral portion of the electrolyte sheet and the frame or manifold that reduces tensile stress in the peripheral portion of the electrolyte sheet when the peripheral portion is bent by pressure differentials or thermal differential expansion. The stress reducer is at least one of a convex curved surface on the inner edge portion of the frame or manifold that makes area contact with the peripheral portion when it bends in response to a pressure differential or thermal differential expansion, and a stiffening structure on the sheet peripheral portion that renders the ceramic sheet material forming the peripheral portion more resistant to bending. The stress reducing mounting reduces cracking in the electrolyte sheet at the peripheral portions due to tensile forces.

12 Claims, 15 Drawing Sheets

FEA Pressure Test Results

Bare Electrolyte (15 x 15 cm or AR = 1) clamped at perimeter
Applied Pressure = 15.5 kPa

Bare Electrolyte (15 x 15 cm or AR = 1) clamped at perimeter
Applied Pressure = 15.5 kPa

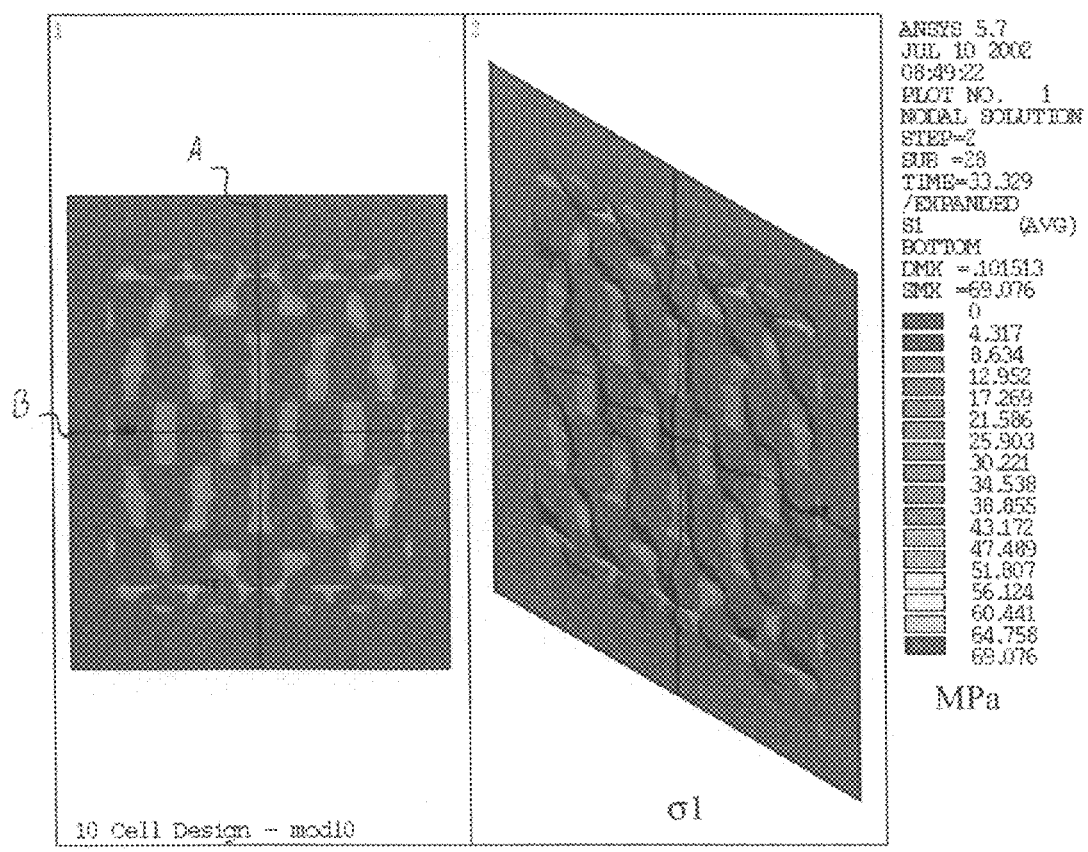
Figure 23A                    Figure 23B

STRESS REDUCING MOUNTING FOR ELECTROLYTE SHEET ASSEMBLY IN A SOLID OXIDE FUEL CELL

BACKGROUND OF THE INVENTION

This invention generally relates to solid oxide fuel cells, and is particularly concerned with a stress reducing mounting between an electrolyte sheet assembly and a support frame in such a fuel cell.

Solid oxide fuel cells incorporating flexible electrolyte sheet assemblies are known in the prior art. In such fuel cells, one or more electrolyte sheet assemblies are supported within a housing between a pair of mounting assemblies, which might be either a frame or a manifold.

In a solid oxide fuel cell device assembly that incorporates a multiple cell design, such as that disclosed in U.S. Pat. No. 6,623,881 assigned to Corning Incorporated, the electrolyte sheet assembly may include an electrolyte formed by a ceramic sheet of zirconia doped with yttrium oxide ($Y_2O_3$) that is between 18-20 microns thick. The doped zirconia sheet supports a plurality of rectangular cells, each of which is formed by an anode and cathode layer on either side of the doped zirconia sheet, and each of which may be between 4-8 microns in thickness. A current collector layer overlies the cathode and anode layer, each of which may be about 20 microns thick and formed from a composite of a silver/palladium alloy and yttria stabilized zirconia (YSZ). The resulting sheet assembly is only about 60 microns in thickness in its central portion, where the cells are arrayed, and has a border region formed solely by the supporting doped zirconia electrolyte sheet, which is only between 18-20 microns in thickness. Such a thin structure advantageously affords a flexibility to such an electrolyte sheet assembly which allows it to withstand the thermal shock associated with many cycles of heating from ambient temperature to a range of 700° C.

In a single cell design, the electrolyte sheet assembly is supported by a ceramic anode layer, which is between 100-1000 microns in thickness and formed from a composite of nickel and yttria stabilized zirconia. Such single cell electrolyte sheet assemblies further include a thin electrolyte layer overlying the anode layer, and a cathode layer overlying the electrolyte. Unlike the multiple cell design, the border portion of single cell sheet assemblies has the same thickness as the central portions, as the structure of the single cell is generally not confined to the central portion of the sheet. Additionally, the single cell design is not as flexible as the previously described multiple cell design due to its greater thickness and lower strength due to the porosity. However, despite their greater stiffness and lower strength, such single cell electrolyte sheet assemblies have proven to have sufficient thermal cycling tolerance to render them practical.

Unfortunately, the stresses and strains imposed upon both types of electrolyte sheet assemblies from thermal shock gradients and thermal expansion due to the many cycles of heating and cooling cause such sheets to fracture over time, which ultimately degrades the power output produced by the solid oxide fuel cell. To solve this problem, it has been suggested in the prior art that a pattern of corrugations be incorporated into the ceramic layers forming the electrolyte sheet to reduce stress and strain. See in particular U.S. Pat. No. 5,519,191 assigned to Corning Incorporated. While such corrugations have proven to be effective, they can cause fabrication difficulties with some types of low cost cell/multi-cell manufacture.

Clearly, what is needed is a way to eliminate, or at least reduce, the amount of fracturing that occurs in flexible electrolyte sheets as a result of the stresses and strains imposed upon them from thermal expansion. Ideally, such a solution should be compatible with both multi-cell and single-cell electrolyte sheet assemblies, and should be easy and inexpensive to manufacture within the sheet assemblies or other components of the solid oxide fuel cell.

SUMMARY OF THE INVENTION

The present invention stems from the inventors' observation that much of the unwanted fracturing that occurs in electrolyte assemblies is caused by tensile stresses generated between the periphery of the sheets and the frames which support them within the fuel cell. According to one aspect of the invention, a stress reducing mounting for an electrolyte sheet assembly in a solid oxide fuel cell substantially reduces the tensile stresses in the periphery of the sheet assembly. The stress reducing mounting is located around the border of the sheet assembly, and reduces the tensile stresses in the flexible ceramic sheet forming the peripheral portion that are caused by the bending of the peripheral portion over the inner edge portion of the frame or manifold, hereinafter referred to as the "support assembly." The stress reducing mounting includes at least one of (1) a convex curved surface on the inner edge portion of the support assembly that makes area contact with the sheet peripheral portion it bends over in response to a pressure differential or thermal expansion, and (2) a stiffening structure on the sheet peripheral portion that renders the ceramic sheet material forming the peripheral portion of the electrolyte sheet assembly more resistant to bending.

The convex curved surface may be a rounded surface having a substantially arcuate profile. In the preferred embodiment, the radius of the arcuate profile is between about 1 mm and 7 cm. A layer of compliant, heat resistant material may be disposed between the convex curved surface and the peripheral portion of the electrolyte sheet. If another support assembly is disposed opposite to the first support assembly, the inner edge of the second support assembly may likewise have a convex curved surface for making area contact with the peripheral portion of the electrolyte sheet.

The stiffening structure of the invention may include a thickening of the ceramic sheet material forming the peripheral portion of the electrolyte sheet assembly where the sheet assembly is attached to the support assembly. For example, if the electrolyte sheet assembly is a multi-cell sheet having a peripheral portion formed from a doped zirconia ceramic sheet 20 microns in thickness, the thickness of the peripheral portion may be increased between about 30 and 60 microns so that its thickness approaches or equals the thickness of the central, electrode bearing portion of the electrolyte sheet assembly. The thickening may be accomplished by integrally adding more of the doped zirconia material forming the peripheral portion, or by adding layers of different ceramics or metals. If the electrolyte sheet assembly is a single cell type sheet having a peripheral portion the same thickness as its central portion, the thickness of the peripheral portion may be increased by the addition of more of the same or different ceramic and/or metallic materials forming the peripheral portion until it substantially exceeds the thickness of the central portion of the sheet.

Alternatively, the stiffening structure may take the form of ribs which, in the case where a ceramic material is used, may be integrally formed with the peripheral portion of the ceramic sheet, for example as corrugations. Where a layer of metal is used to increase the peripheral portion thickness, the metal may be an extension of an outer metal layer that forms the current collectors of the electrodes disposed across the electrolyte sheet. In all cases, the thickening of the peripheral portion does not have to extend completely to the edge of the peripheral portion; it only needs to come a sufficiently close distance to the edge such that the peripheral portion is substantially stiffened. Such a thickening pattern is preferred when the thickening material is an extension of the outer metal layer that forms the current collectors of the electrodes in a multi-cell electrolyte sheet. Finally, the thickening of the peripheral portion does not have to be uniform across the peripheral portion; instead, it might increase from an edge of the peripheral portion toward a central axis of an electrolyte sheet. The profile of the increased thickening toward the central axis of the sheet may assume the form of a ramp, a set of steps, or a curve.

One or both of the aforementioned types of stress reducers may form the stress reducing mounting used to reduce tensile stresses in the peripheral portion of the electrolyte sheet as it is flexed and bent in response to thermal differential expansion. The invention is applicable to electrolyte sheet assemblies having peripheral portions are highly flexible and compliant, as well as electrolyte sheets up to 200 microns in thickness having limited flexibility.

DESCRIPTION OF THE DRAWINGS

FIG. 1 is a perspective view of a solid oxide fuel cell that the stress reducing mounting of the invention may be used in;

FIGS. 23A and 23B are a plan view and perspective view of a graph that illustrates how the second embodiment of the invention lowers the stress of the electrolyte sheet assembly around its peripheral portion.

DETAILED DESCRIPTION OF THE PREFERRED EMBODIMENTS

Figure 1:
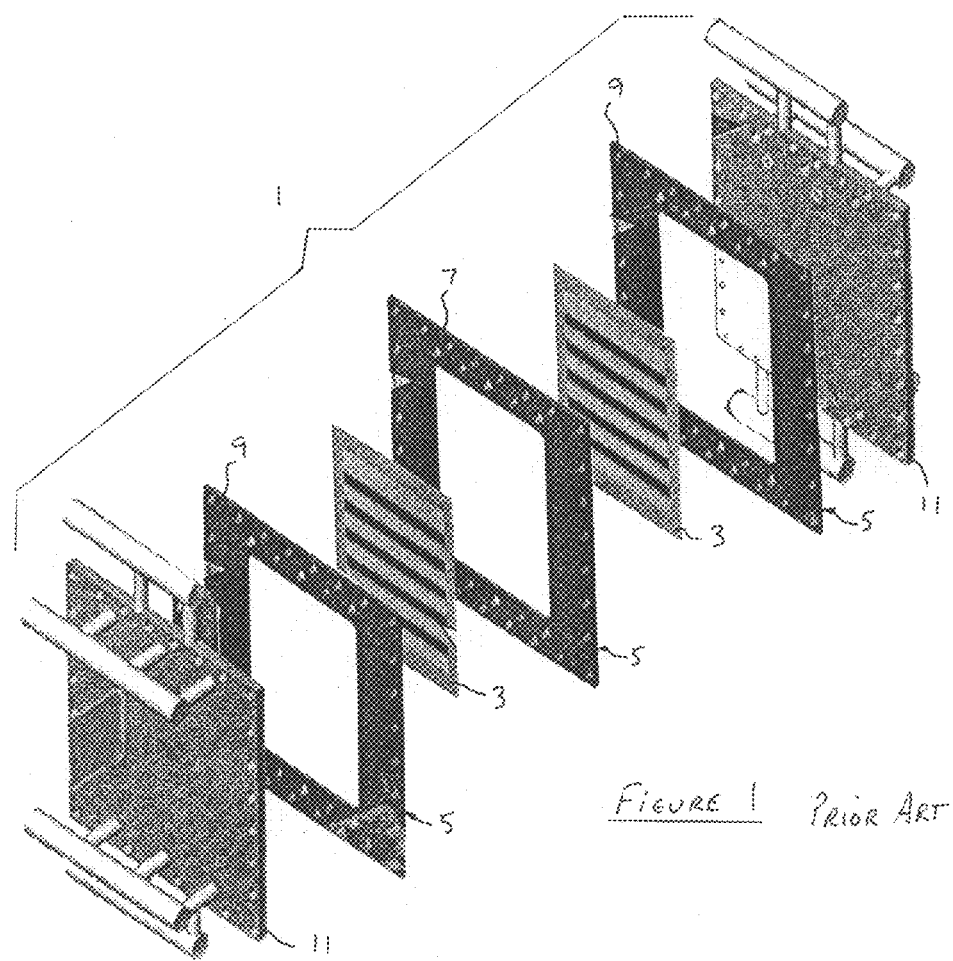

With reference to FIG. 1, wherein like numbers designate like components throughout all the several figures, the stress-reducing mounting of the invention may be used in solid oxide fuel cells device assemblies 1 (also called fuel cells herein), such as that illustrated in FIG. 1. In such fuel cells, electrolyte sheet assemblies 3 are supported within the fuel cell by support assemblies 5 taking the form of a fuel frame 7 flanked by a pair of air frames 9. The electrolyte sheet assemblies are clamped between the frames 7, 9 by a pair of end plates or manifolds 11. It should be noted that the solid oxide fuel cell 1 illustrated in FIG. 1 is only one of many designs that the stress-reducing mounting of the invention may be used in connection with. Generally speaking, the mounting of the invention is applicable to any solid oxide fuel cell having electrolyte sheet assemblies secured by frames or manifolds or any other structure that supports some or all of the periphery of such sheet assemblies 3. All such frames, manifolds or other supporting structures are collectively defined herein as "support assemblies."

Figure 2:
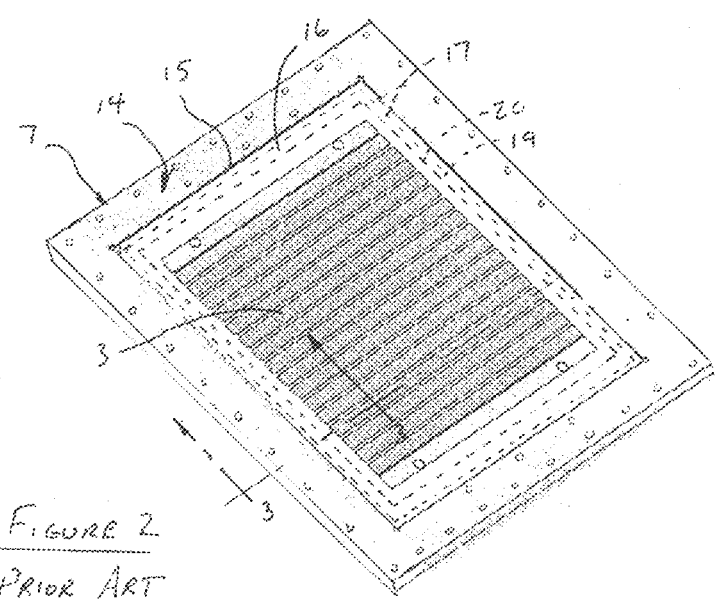
FIG. 2 is a perspective view of a multi-cell electrolyte sheet assembly supported by a prior art fuel frame.
Figure 3:
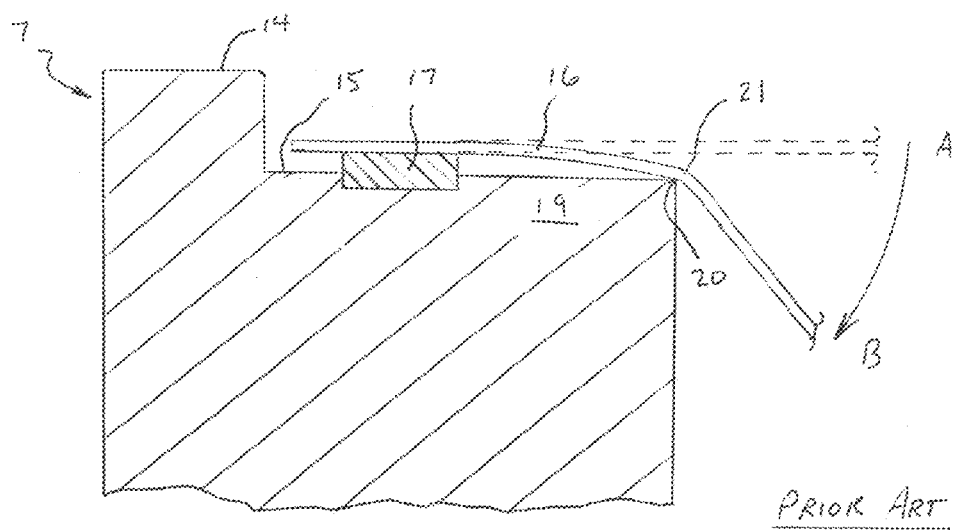
FIG. 3 is a sectional view of the frame and electrolyte sheet of FIG. 2 taken along the line 3-3.

With reference to FIGS. 2 and 3, in fuel cells such as that illustrated in FIG. 1, the fuel frame 7 includes a facing surface 14 which surrounds a rectangular recess 15. Recess 15 closely receives a rectangularly-shaped electrolyte sheet assembly 3. The sheet assembly 3 is secured onto the fuel frame 7 by means of a seal 17 which bonds the entire outer edge of the sheet 3 to the frame 7. The seal 17 is typically formed from a heat resistant cermet material capable of bonding with both the ceramic material forming the peripheral portion 16 of the sheet assembly 3, and the metal forming the fuel frame 7.

As is best seen in FIG. 3, the frame has an inner edge 19 that supports the seal 17 and peripheral portion 16 of the sheet assembly 3, and which terminates in a right-angled corner 20. As set forth in is detail hereinafter, this invention stems from the inventors' observations of the effect of the right-angled corner 20 on the peripheral portion 16 of the electrolyte sheet assembly 3 during the operation of the fuel cell. During such operation, the peripheral portion 16 of the sheet assembly 3 flexes from position A to position B as a result of thermal differential expansion and pressure differentials. Such flexing concentrates high stress levels along the line contact 21 between the sheet assembly 3 and the corner 20 which, over time, may be sufficient to fracture or crack the sheet assembly 3 in this region. The purpose of the invention is to prevent high tensile stresses from occurring in the peripheral portion 16 of the sheet assemblies 3 along the inner edge portion 19 of the frame 7.

Figure 4:
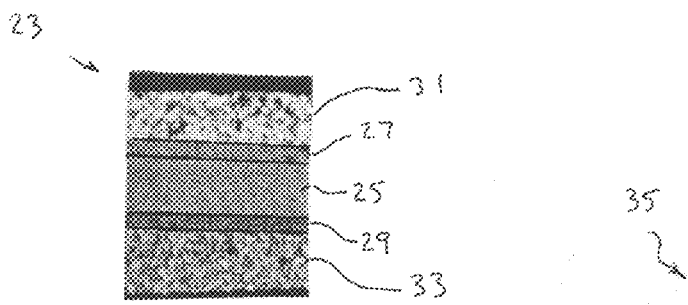
FIG. 4 is a cross-sectional view of a central portion of a prior art multi-cell electrolyte sheet assembly.
Figure 5:
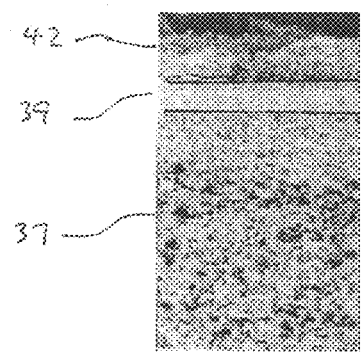
FIG. 5 is a cross-sectional view of a prior art single cell electrolyte sheet assembly.

While the invention may apply to any type of flexible ceramic electrolyte sheet assembly, it finds particular application to the types of sheet assemblies illustrated in FIGS. 4 and 5. FIG. 4 illustrates a cross-section of a multi-cell electrolyte sheet assembly 23 of the type manufactured and sold by Coming Incorporated and described in detail U.S. Pat. No. 6,623,881, likewise assigned to Coming Incorporated. Such multi-celled electrolyte sheet assemblies 23 include a central, supporting ceramic sheet 25 of zirconia doped with 3% yttrium oxide ($Y_2O_3$). Ceramic sheet 25 is approximately 20 microns thick. On opposite sides of the ceramic sheet 25 are a cathode layer 27, and anode layer 29, each of which may be between 4-8 microns thick and formed from another ceramic layer of material. Overlying the cathode layer and anode layer are a cathode current collector 31 and an anode current collector 33, both of which are about 20 microns thick, and both of which have an outer layer formed from a silver palladium alloy. Hence, the central portion of a multi-cell electrolyte sheet assembly 23 is about 70-75 microns thick while, the peripheral portion 16, formed exclusively of the yttrium-doped zirconia sheet 25, is only about 20 microns thick. In the single cell electrolyte sheet assembly 35 illustrated in FIG. 5, the supporting ceramic sheet 37 is the anode layer of the cell, and is likewise constituted predominately from yttrium-doped zirconia. A 5 micron thick layer of electrolyte 39 overlies the anode layer 37, and a 50 micron thick cathode layer 42 overlies the electrolyte layer 39. Because the anode layer 37 may be between 100-1000 microns thick, the peripheral portion 16 of such single cell electrolyte sheet assemblies 35 is thicker and somewhat stiffer than the peripheral portion 16 of multi-cell electrolyte sheet assemblies 23. This invention applies to single cell electrolyte sheet assemblies 23 having peripheral portions 16 that are 200 microns or less in thickness, as such sheet assemblies are sufficiently flexible to be subjected to the types of tensile bending stresses illustrated in FIG. 3.

Figure 6:
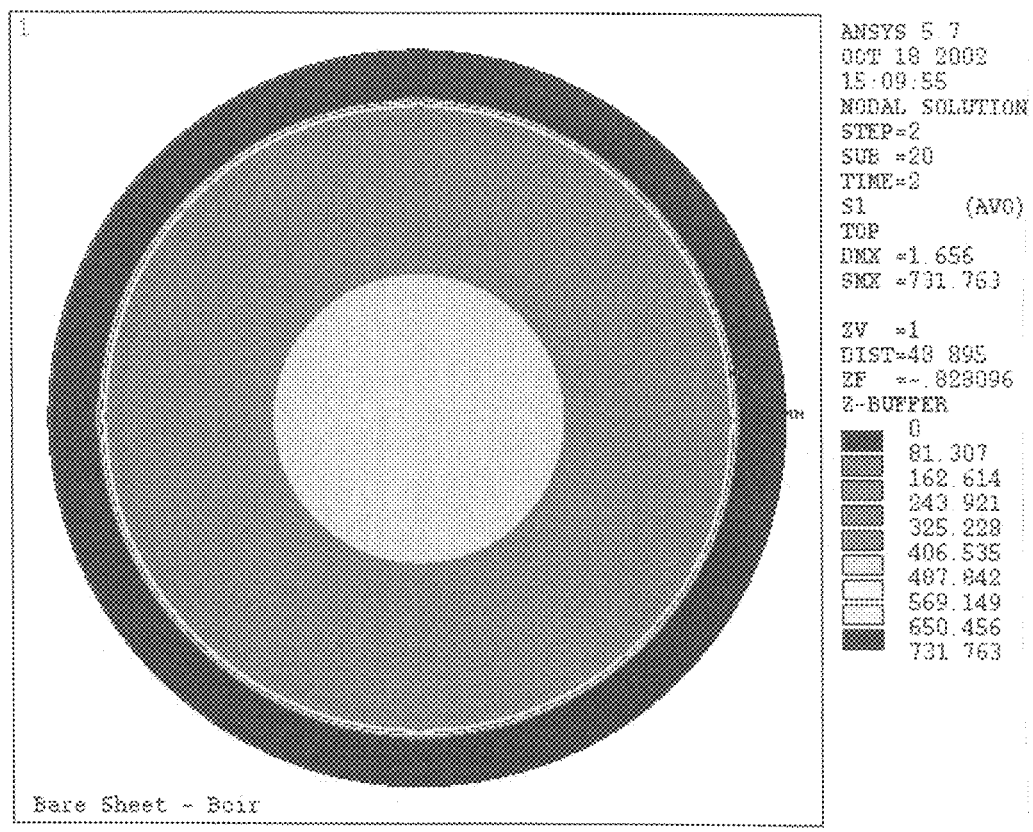
FIG. 6 is a free element analysis illustrating a plot of principal stress on the top surface of a 3" diameter electrolyte sheet assembly 20 microns thick mounted in a circular frame with a gas pressure differential of 35 kilopascals (KPa) applied thereto.
Figure 7:
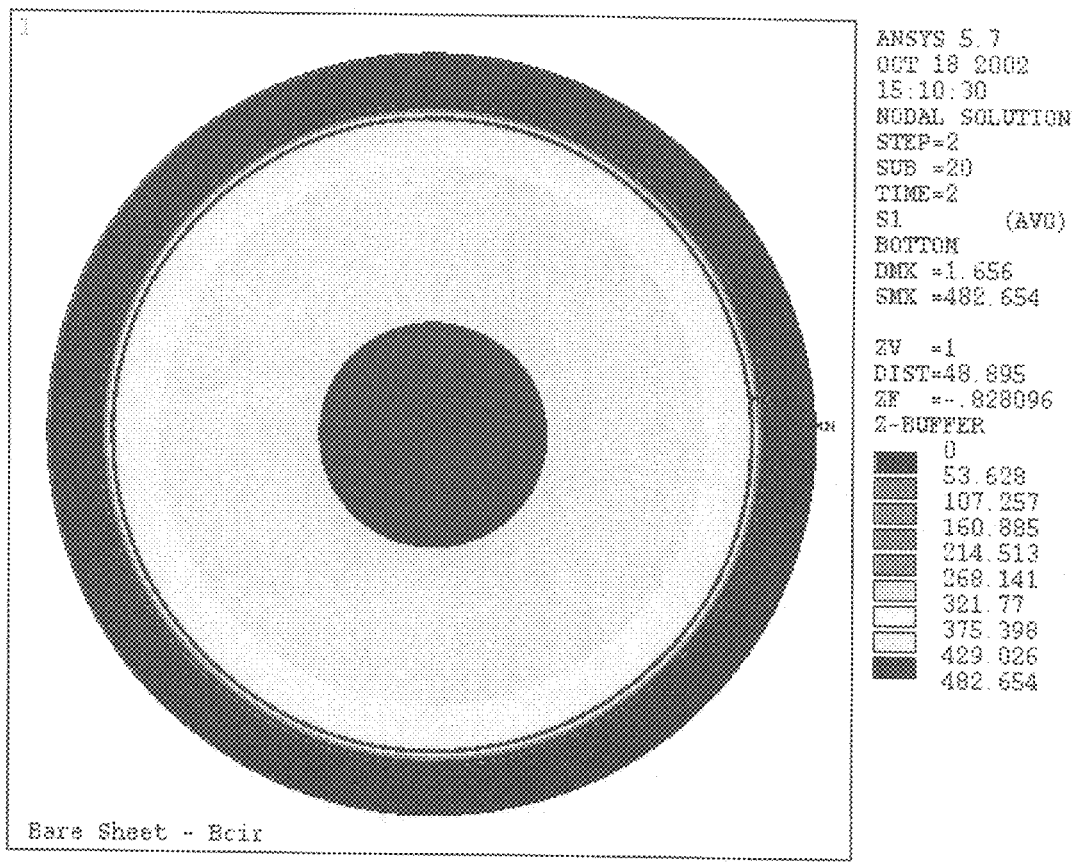
FIG. 7 is a free element analysis graph of the principal stress on the bottom surface of the 3" diameter, 20 micron thick electrolyte sheet assembly of FIG. 6 with a gas pressure differential of 35 KPa.

FIGS. 6 and 7 illustrate the distribution of pressure-induced stresses on a top and bottom surface of a circular sample of an electrolyte sheet assembly mounted in a circular frame with a gas pressure differential of 35 KPa applied thereto. As is evident in both graphs, the highest stresses occur in the circular region where the sheet material forming the electrolyte assembly contacts the edge of the circular frame.

Figure 8:
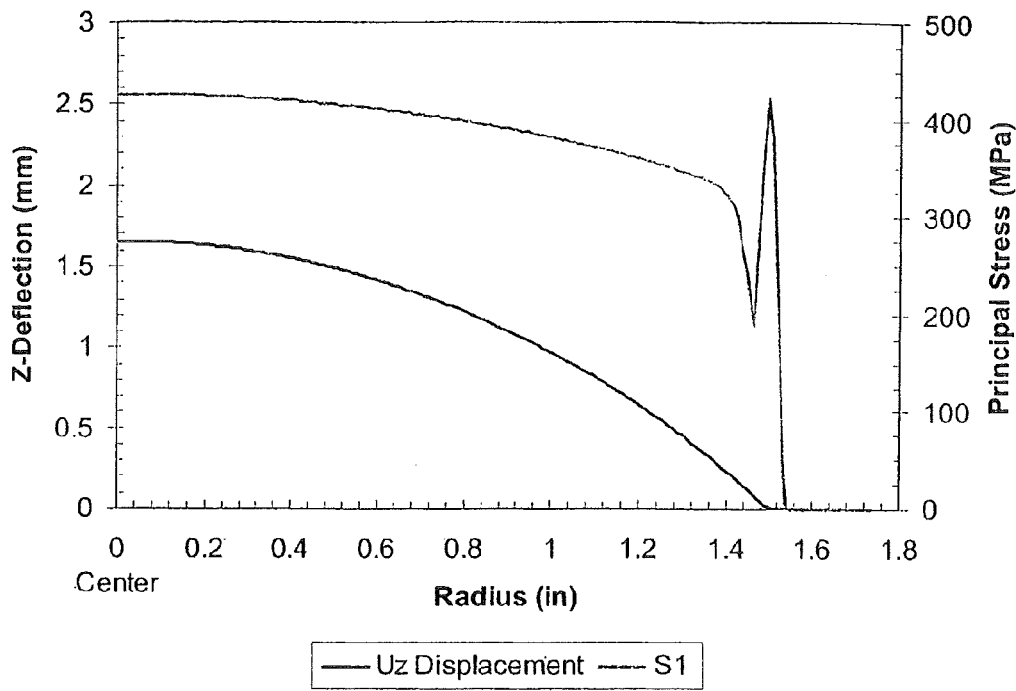
FIG. 8 is a graph illustrating both Z deflection and principal stress over the radius of the circular section of electrolyte sheet assembly described with respect to FIGS. 6 and 7, illustrating in particular a spike of high stress in the section of the sheet assembly adjacent to the frame.

FIG. 8 illustrates even more clearly how stresses are maximized in the region where the electrolyte sheet assembly contacts the support frame that surrounds it. As is seen in the upper graph, tensile-induced stresses spike at a radius of slightly less than 1.5 inches from the center of the three inch diameter sample.

Figure 9:
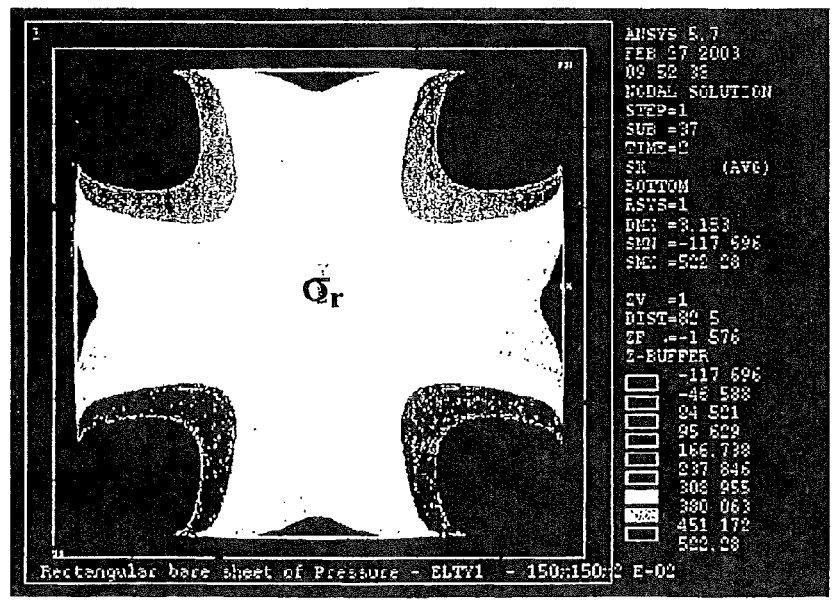
FIG. 9 is a plot of stress distribution in the top surface of a square sheet of a 20 micron thick electrolyte sheet assembly which is clamped around its perimeter, with an applied pressure of 15.5 KPa.
Figure 10:
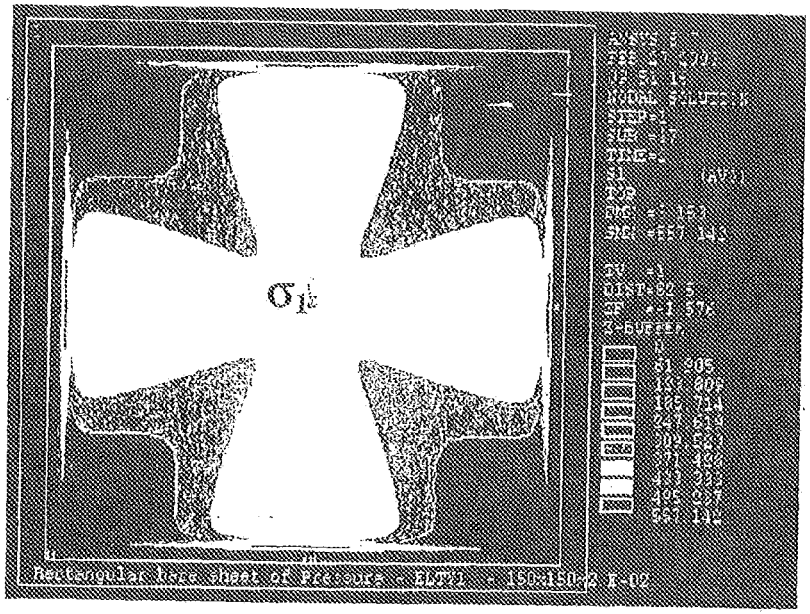
FIG. 10 is the same stress plot made with respect to the bottom surface of the square sheet of 20 micron thick electrolyte sheet assembly of FIG. 9, with an applied pressure of 15.5 KPa.

FIGS. 9 and 10 illustrate the distribution of tensile stresses for square samples of an electrolyte sheet assembly that are 15 centimeters by 15 centimeters in size for an applied pressure of 15.5 kPa. FIG. 9 illustrates the stresses on the top surface of such a sheet assembly, while FIG. 10 illustrates the stresses on the bottom surface. In both cases, stress is maximized along the central portions of each of the edges of the sample electrolyte where the electrolyte interfaces with the inner edge of the supporting frame. The stresses are higher around the edges of the top surface of the sheet than on the bottom surface due to the greater tensile forces generated along the outer surface of the bend in the sheet assembly created by the pressure. It was stress measurements such as those illustrated in FIGS. 6-10 that inspired the development of the present invention.

Figure 11:
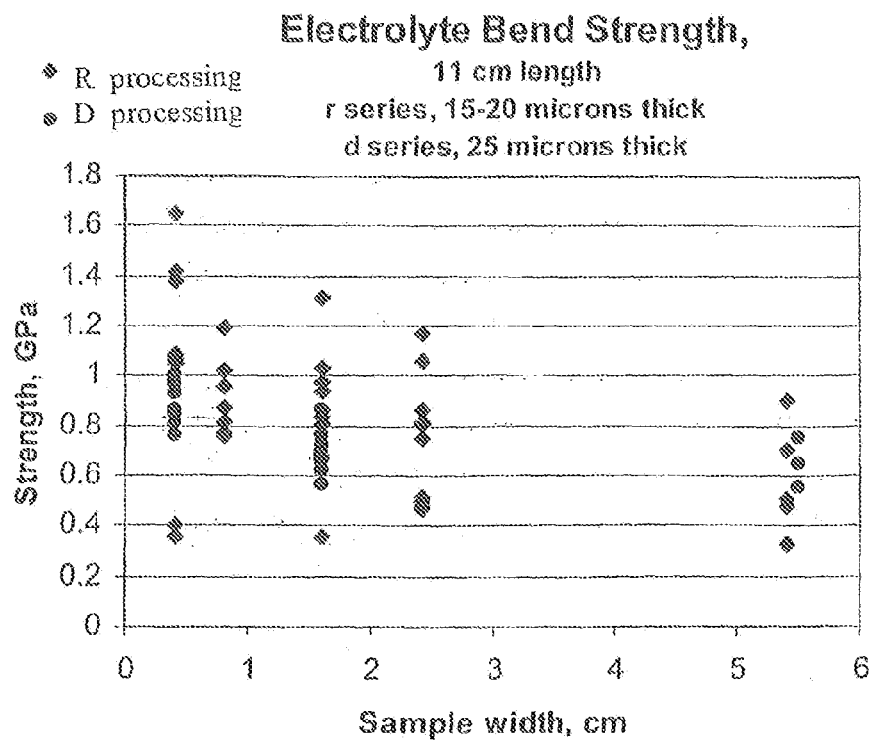
FIG. 11 is a graph illustrating the bend strength of an electrolyte sheet assembly as a function of sample width for both assemblies (R series) that are 15-20 microns thick and assemblies (D series) that are 25 microns thick.
Figure 12:
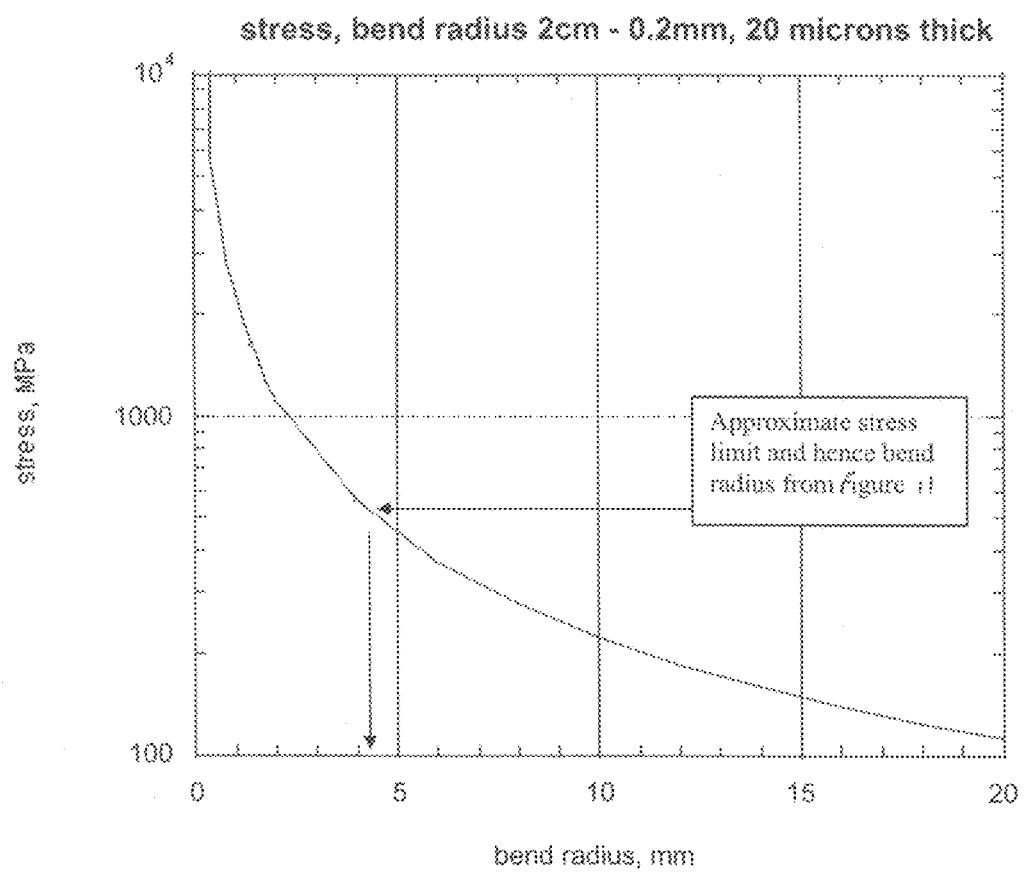
FIG. 12 is a graph illustrating how stress in the electrolyte sheet assembly increases logarithmically as a function of bend radius.

FIG. 11 is a graph illustrating the electrolyte bend strength for samples 11 centimeters in length for "r" series of multi-cell electrolyte sheet assemblies that are 15-20 microns thick, and "d" series that are 25 microns thick, both of which are manufactured by Corning Incorporated. As may be seen in the graph of FIG. 11, bend strength, on average, decreases as the sample width increases from 0.5 centimeters to 5.5 centimeters. To obtain the sample points on the graph of FIG. 11, bend strength was measured between two parallel platens. All samples were sintered at 1430° C. for a period of two hours. The data from the graph of FIG. 11 was used to compute the points on the graph of FIG. 12, which illustrates how stress increases logarithmically with the bend radius that a sample of electrolyte sheet assembly is subjected to. In particular, the graph of FIG. 12 illustrates that the stress limit (i.e., breaking point) of an electrolyte sheet assembly between 15 and 25 microns thick is approached at a bend radius of slightly over 4 millimeters.

Figure 13:
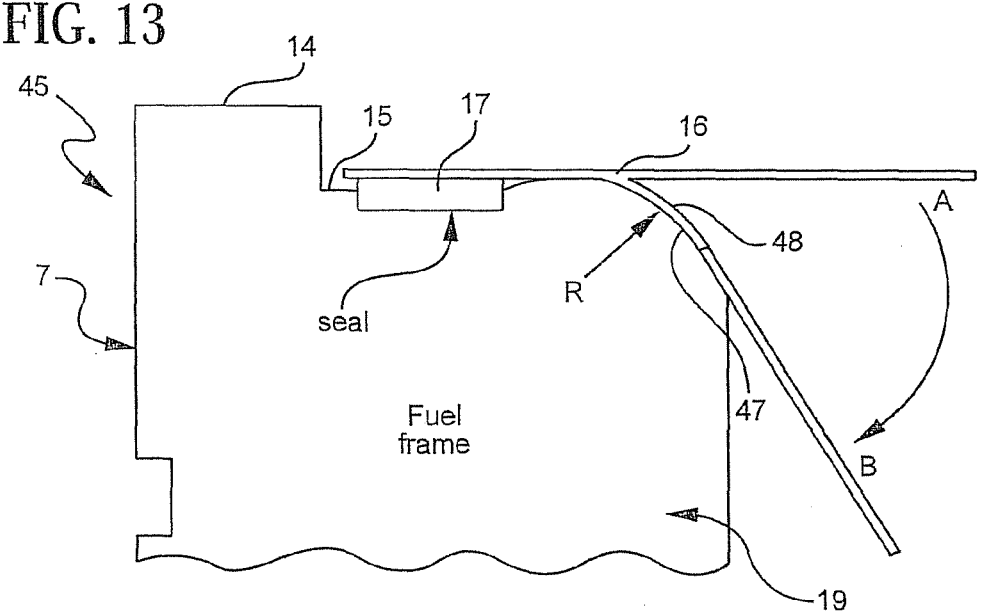
FIG. 13 is a cross-sectional view of a first embodiment of the stress-reducing mounting of the invention, illustrating the provision of a convex curved surface on the inner edge of the frame that supports the sheet assembly.

FIG. 13 illustrates the first embodiment of the invention, wherein the generally right-angled corner 20 of the inner edge 19 of the fuel frame 7 has been replaced with a convex curved surface 47. The convex curved surface 47 allows area contact 48 to be made between the inner surface of the peripheral portion 16 of the electrolyte sheet 3 and the inner edge 19 of the fuel frame 7. In the preferred embodiment, the radius R of the convex curved surface 47 is between 1 millimeter and 4 centimeters, and more preferably between about 4 millimeters and 1 centimeter. The lower limit of the more preferable range would keep the peripheral portion 16 of the electrolyte sheet 3 from ever exceeding a bend radius that would exceed the stress limit of the sheet assembly 3 when the peripheral portion is between 15 and 25 microns thick, while the upper limit would perform the same function for thicker electrolyte sheets having peripheral portions 16 up to 200 microns in thickness.

Figure 14:
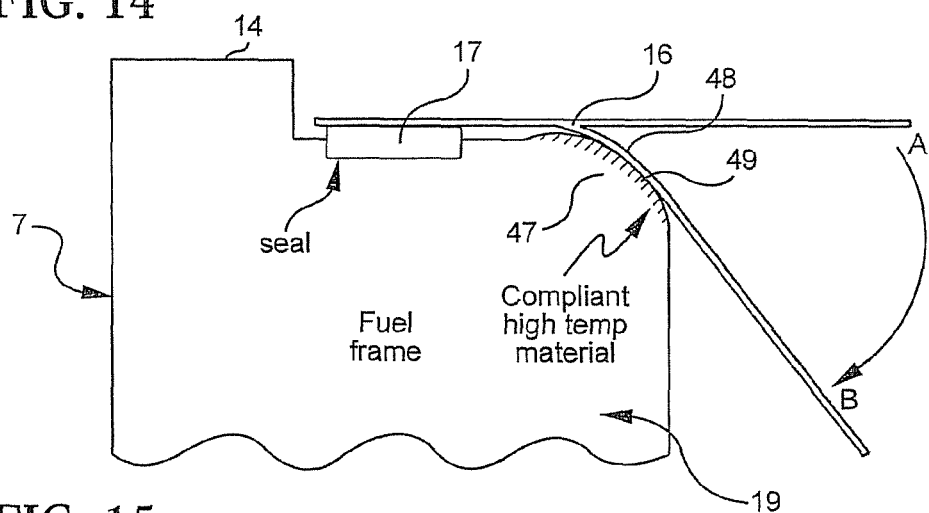
FIG. 14 is a cross-sectional view of a first variation of the first embodiment of the invention, wherein a compliant layer of heat-resistive material is applied to the convex curved surface of the frame inner edge.

FIG. 14 illustrates a variation of the first embodiment of the invention, wherein a compliant layer 49 of heat resistant material is applied between the inner surface of the peripheral portion 16, and the convex curved surface 47 of the inner edge 19 of the frame 7. Examples of such compliant materials include zirconia felt, zirconia cloth, alumina paper and alumina mat. Commercially available examples of such materials include zirconia felt of the ZYF type, including ZYF-150, ZYF-100 and ZYF-50, and zirconia cloth of the ZYW type, including ZYW-15 and ZYW-30A made by Zircar Zirconia, Inc., PO Box 287, Florida N.Y., 10921-0287 USA. Further examples include alumina paper of the APA-1 and APA-2 types and alumina mat, (95-97% alumina) all made by Zircar Ceramics, 100 North Main Street, PO Box 519, Florida N.Y., 10921-0519. As manufactured, some of these materials may be too thick, and may need to be thinned down by removing material or by pressing to reduce the porosity and the thickness. Additionally, custom manufactured fibers of various rare earth oxides, hafnium oxide and cerium oxide may be formed into mats, cloths and papers suitable for forming a compliant material usable in such an application so long as the fibers do not decompose or react at 700-900° C. in air or in the fuel cell fuel stream and do not introduce unwanted impurities into the fuel cell during operation. This could also be accomplished by making the fibers from the materials already present in the fuel cell, i.e. zirconia, Ni(O)-zirconia fiber based material, or materials such as alumina which do not corrupt the electrolyte, electrodes, current collectors, seals or frame materials. Such a compliant material 49 lends added assurance that a uniform, area contact 48 will be made between the peripheral portion 16 of the electrolyte sheet 3 and the inner edge 19 of the frame 7 since its compliant nature will cause it to adopt whatever curved shape the peripheral portion 16 is bent into as a result of pressure differentials or thermal differential expansion. Consequently, the addition of such a compliant, high temperature material 47 reduces stresses in the peripheral portion 16 of the electrolyte sheet 3 even further than the provision of a convex curved surface 47 on the inner edge 19 of the frame 7.

Figure 15:
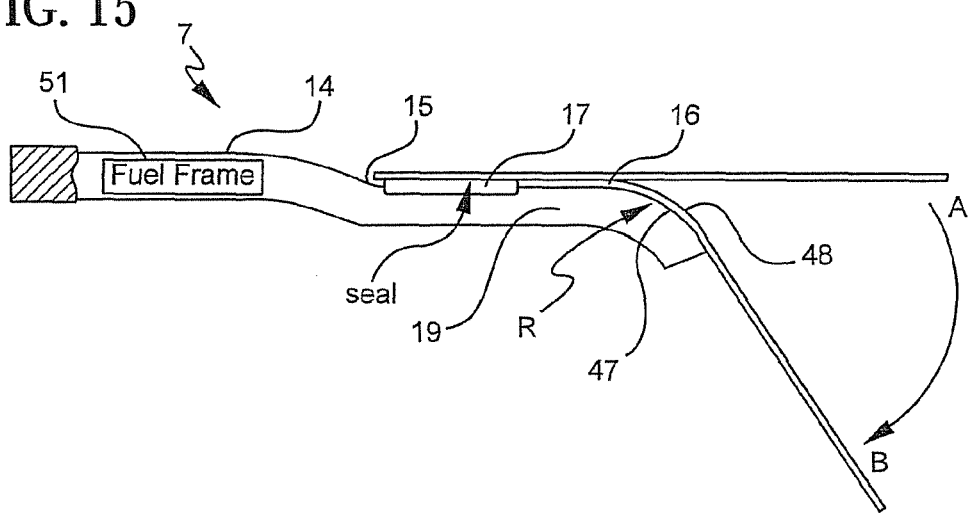
FIG. 15 is a cross-sectional view of the first embodiment of the invention applied to a different type of support frame.

FIG. 15 illustrates the invention as applied to a different type of fuel frame 51 which is thinner than the fuel frame 7 illustrated in FIG. 14, and formed from stamped metal. In all other of the respects, however, the invention is the same.

Figure 16:
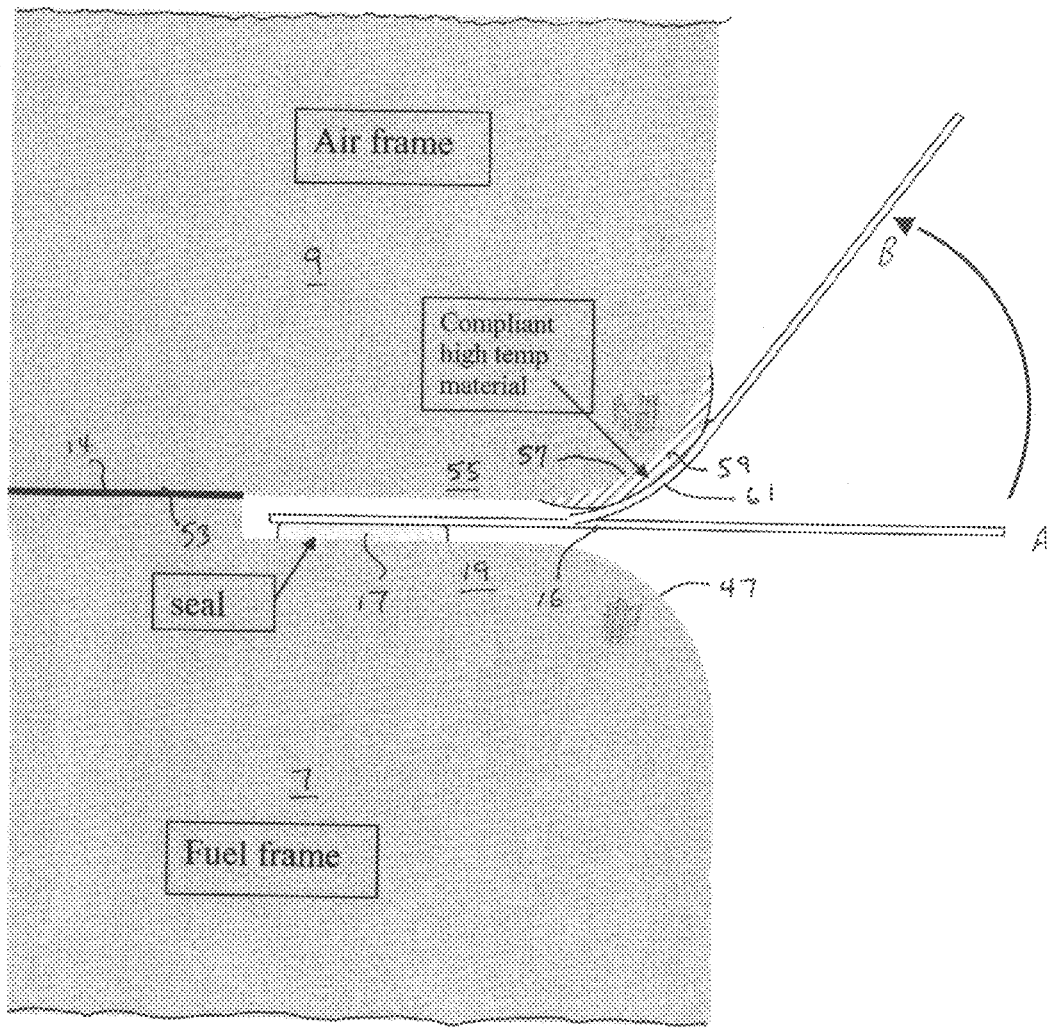
FIG. 16 is a cross-sectional view of a first embodiment of the invention applied to a pair of adjacent frames.

FIG. 16 is a cross-sectional view of the first embodiment of the invention as applied to a pair of adjacent frames, i.e. a fuel frame 7, and an air frame 9. In this embodiment of the invention, the inner edges 19 and 55 of both the fuel frame 7 and the air frame 9 have curved surfaces 47, 57 as shown. Additionally, the air frame 9 includes a compliant, high temperature material 59 applied over the inner edge portion 55 so that the edge portion 55 can more exactly adapt to the shape of the peripheral portion 16 of the electrolyte sheet 3 when it is bent from the position A to position B. The provision of curved surfaces 47, 57 on the adjacent frames 7, 9 ensures that tensile stresses will be reduced in the peripheral portion 16 of the electrolyte sheet assembly 3 regardless of the direction that the sheet assembly 3 is flexed as a result of pressure differentials or thermal differential expansion.

Figure 17:
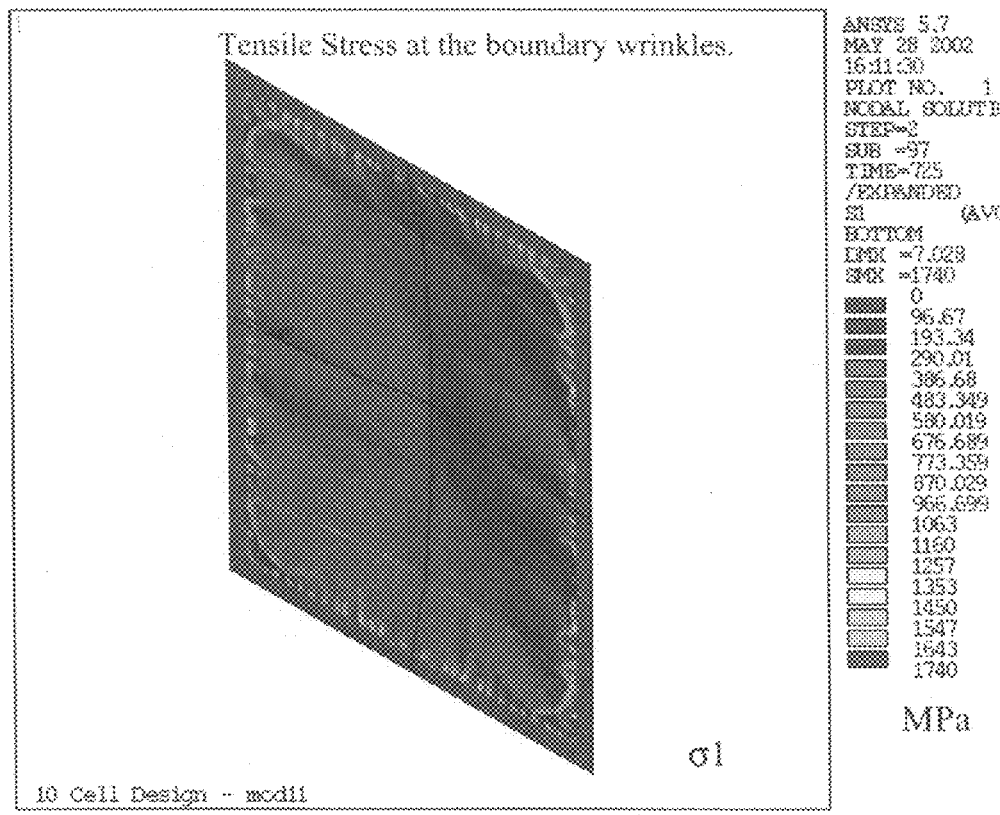
FIG. 17 is a perspective view of a stress distribution graph across a rectangularly-shaped electrolyte sheet assembly mounted in an electrolyte frame which was obtained via free element analysis.
Figure 18:
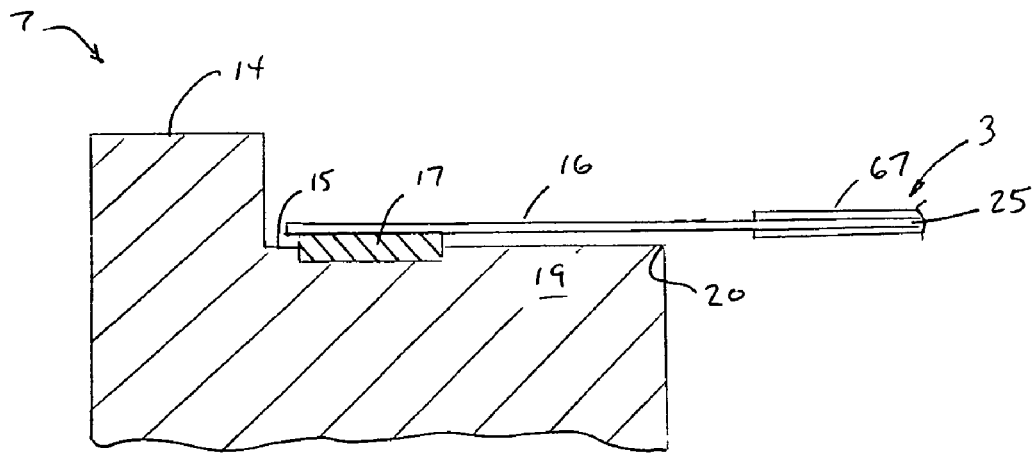
FIG. 18 is a cross-sectional view of an air frame and electrolyte sheet assembly as mounted in accordance with the prior art.

FIG. 17 is a different type of graph illustrating not only the tensile stresses in the boundary area of an electrolyte sheet assembly 3, but the stresses created by the wrinkling of the peripheral portion 16 of the sheet assembly 3 when either pressure or thermal differential expansion causes the sheet assembly 3 to flex inwardly with respect to a fuel frame 7. As is evident in the graph of FIG. 17, such wrinkling creates irregularities in the stresses experienced by the peripheral portion 16 of the electrolyte sheet in the areas where the sheet 3 contacts the inner edge 20 of a conventional fuel frame. It was these observations, in combination with the previously discussed pressure graphs illustrated in FIGS. 6-12, that gave rise to the concept of the second embodiment of the invention, best understood by comparing FIGS. 18 and 19A. FIG. 18 illustrates a prior art multi-cell electrolyte sheet assembly 3 having a peripheral portion 16 secured around a fuel frame 7 by a seal 17. As has been indicated earlier, the peripheral portion 16 consists only of a relatively thin, ceramic sheet of zirconia 25 between 18 and 20 microns thick that has been doped with yttrium oxide. By contrast, the central portion 67 of the multi-cell sheet assembly 3 includes anode and cathode layers, and anode and cathode current collectors as previously described, the combination of which renders the central portion 67 of such a sheet 3 to be about 70-75 microns in thickness, or about three and a half times the thickness of the peripheral portion 16.

Figure 19A:
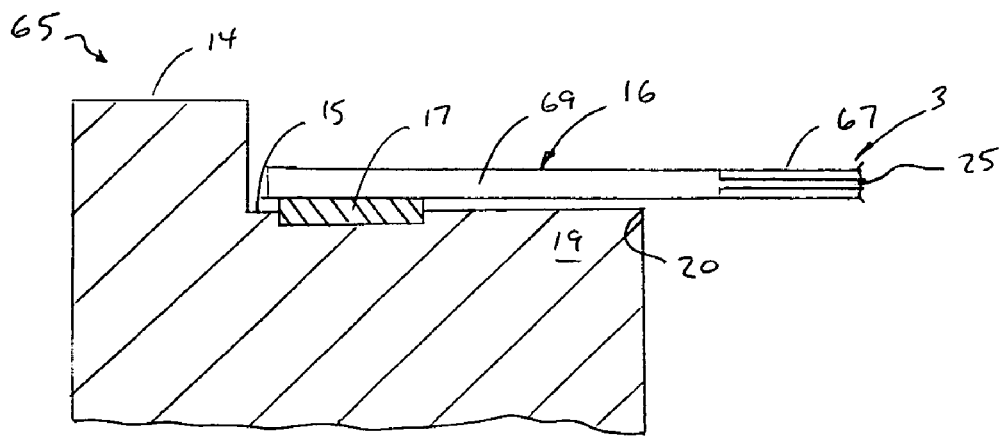
FIGS. 19A-19D illustrate variations of a second embodiment of the stress-reducing mounting of the invention illustrating a thickening of the peripheral portion of the supporting ceramic sheet of a multi-cell electrolyte sheet assembly.

FIG. 19A illustrates the second embodiment of the invention, which comprises a thickened portion 69 over the peripheral portion 16 of the electrolyte sheet assembly 3. In this preferred embodiment, the portion 69 of the peripheral portion 16 has been created by simply adding more yttrium doped zirconia to the zirconia sheet 25 that supports the rest of the multi-cell electrolyte sheet assembly 3. This might be done by printing and sintering an additional layer of zirconia over the peripheral portion 16 that integrally attaches to the zirconia forming the peripheral portion 16. While FIG. 19A illustrates the thickened portion 69 as being approximately the same thickness as the central portion 67 of the electrolyte sheet assembly 3, the second embodiment of the invention also encompasses a lesser thickening, wherein the thickened portion 69 may be only about 60% as thick as the central portion 67.

Figure 19B:
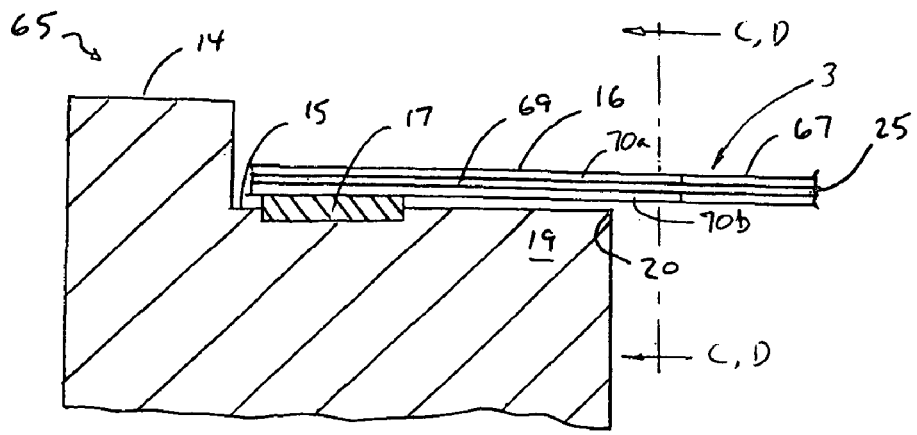

FIG. 19B illustrates a first variation of the second embodiment of the invention, wherein the thickened portion 69 is formed by applying layers 70a, 70b on either side of the supporting ceramic sheet 25 at the peripheral portion 16. While layers 70a, 70b are preferably formed from a ceramic material which may be easily printed, deposited or otherwise built up on the zirconia ceramic sheet 25 at the peripheral portion 16, they may also be formed from metal such as, for example, nickel or a nickel alloy or silver-palladium. Whether the layers 70a, 70b are formed from ceramic or metallic material, it is essential that they bond securely onto the zirconia sheet 25 forming the peripheral portion 16 of the electrolyte sheet 3 in order to increase the tensile strength of the sheet 3 at the peripheral portion 16.

Figure 19C:
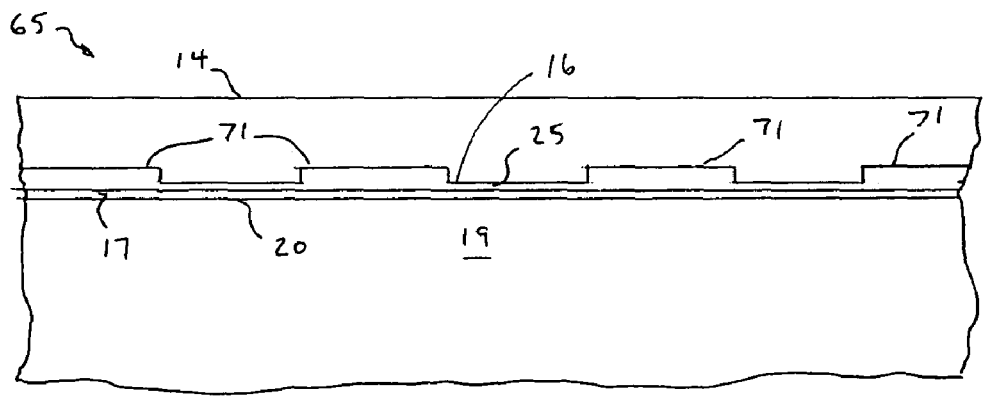
Figure 19D:
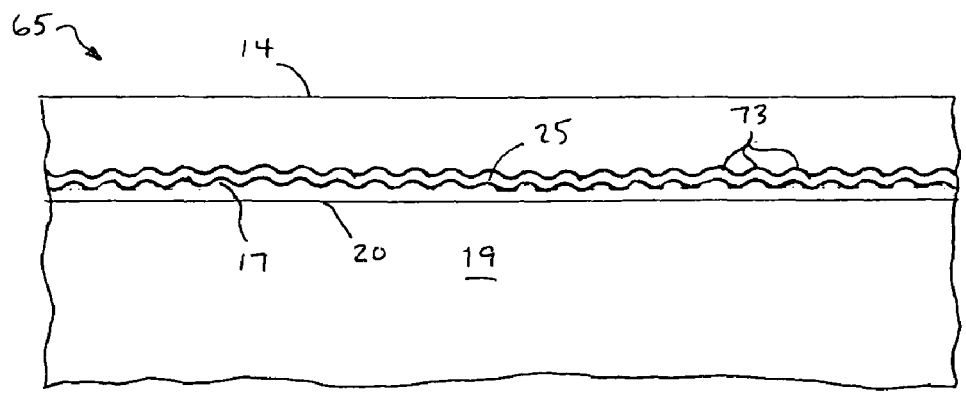

FIGS. 19C and 19D illustrate other variations of the second embodiment of the invention, respectively. FIG. 19C illustrates how ribs 71 may be applied to the upper surface of the zirconia sheet 25 at the peripheral portion 16 of the electrolyte sheet assembly 3 in order to strengthen it. Such ribs 71 are preferably integrally formed from the same zirconia that forms a zirconia sheet 25. While illustrated as being applied only to the upper surface of the zirconia sheet 25, they may be alternatively or exclusively placed on the lower surface. However, such a configuration is generally not preferred due to the complications that it may cause with respect to the seal 17. Ribs 71 may, analogous to the FIG. 19A, be formed from overlaying a non-zirconia ceramic or a metallic material that bonds securely to the surface of the peripheral portion 16 of ceramic sheet 25. FIG. 19D illustrates still another variation of the second embodiment of the invention, wherein corrugations 73 are integrally molded into the peripheral portion 16 of the ceramic sheet 25. In both of the variations illustrated in FIGS. 19C and 19D, the height of the ribs 71 or corrugations 73 is about the same of the thickness of the center portion 67 of the electrolyte sheet assembly 3. The relative thickness of the ribs 71 and corrugation 73 need not be exactly the thickness of the central portion; so long as the thickness is over 50% of the central portion, the shear strength of the peripheral portion 16 of the electrolyte sheet assembly 3 can be advantageously enhanced to an amount that substantially lowers the tensile stresses of the electrolyte sheet assembly 3 in these areas during the operation of the fuel cell.

Figure 20:
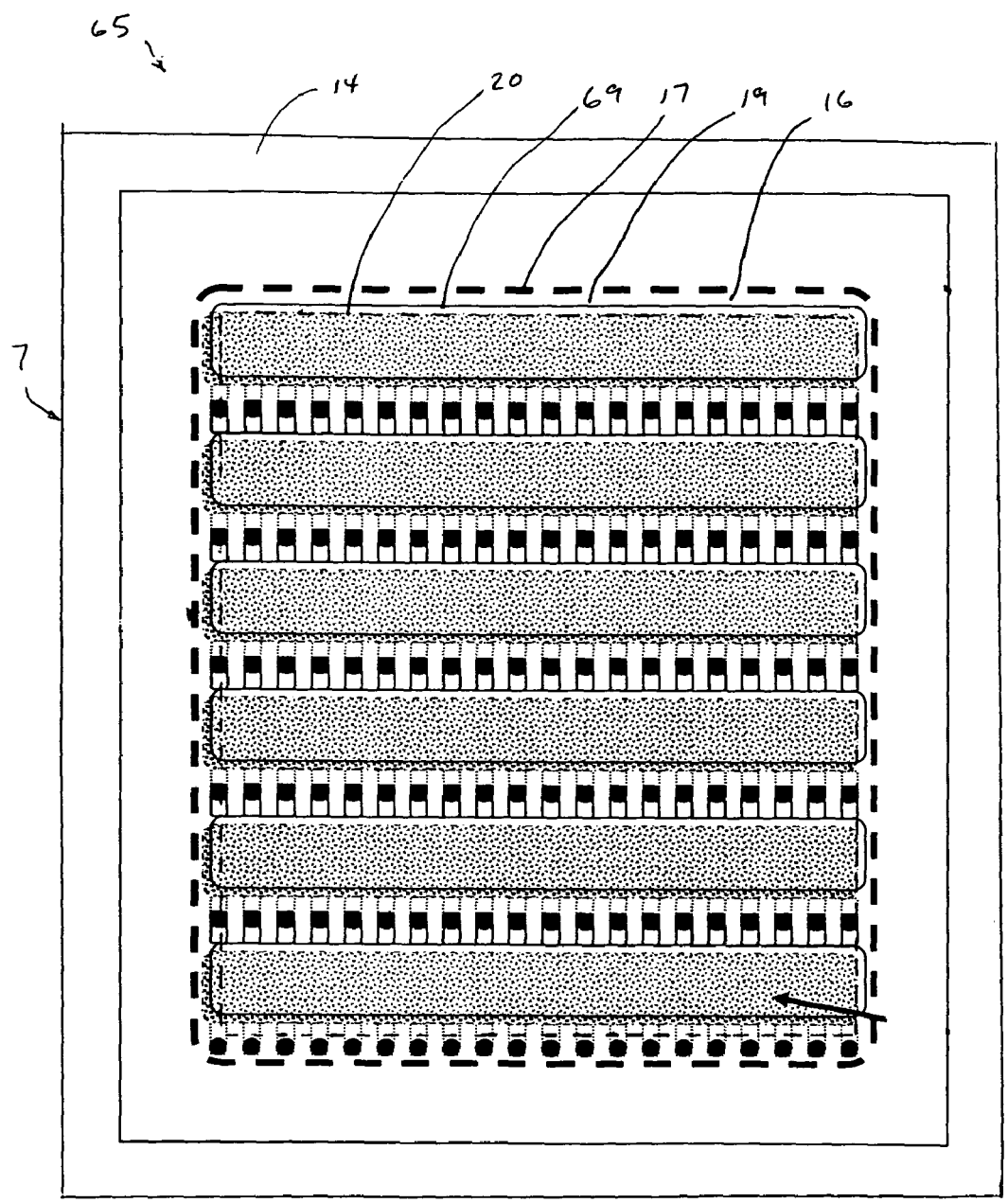
FIG. 20 is a further variation of the second embodiment of the invention, illustrating how the electrode layers of a multi-cell electrolyte sheet have been extended almost to the seals to provide a thickening of the peripheral portions of the electrolyte sheet assembly.

FIG. 20 illustrates still another variation of the second embodiment of the invention, wherein the thickened portion 69 of the peripheral portion 16 does not extend completely to the seal 17. While this variation of the invention may be carried out by either thickening the ceramic sheet 25 or adding ribs 71 or corrugations 73 as has been described with respect to the variations illustrated in FIGS. 19A through 19D, the variation illustrated in FIG. 20 has been implemented merely by extending the layers 27, 30, 31 and 33 that form the cells of the electrolyte sheet assembly 3 out to where these layers 27, 29, 31 and 33 extend almost to the seal 17. While it is possible to extend these layers completely to the seal 17, such a variation of the invention is not preferred due to undesirable electrolytic reactions that may occur between the silver palladium alloys forming the cathode and anode current collector layers 31 and 33, and the metal forming the fuel frame 7. In this particular variation of the invention, the layers 27, 29, 31 and 33 forming the cells of the electrolyte sheet assembly 3 should extend over 60% of the width of the peripheral portion 16 of the sheet assembly 3. Accordingly, if the peripheral portion 16 were normally about five millimeters in width, the layers 27, 29, 31 and 33 should extend at least three millimeters toward the seal 17 in order to reinforce the peripheral portion 16 with sufficient strength to substantially lower tensile stresses caused by bending. More preferably, the distance between these layers and the seal 17 should be about one millimeter.

Figure 21:
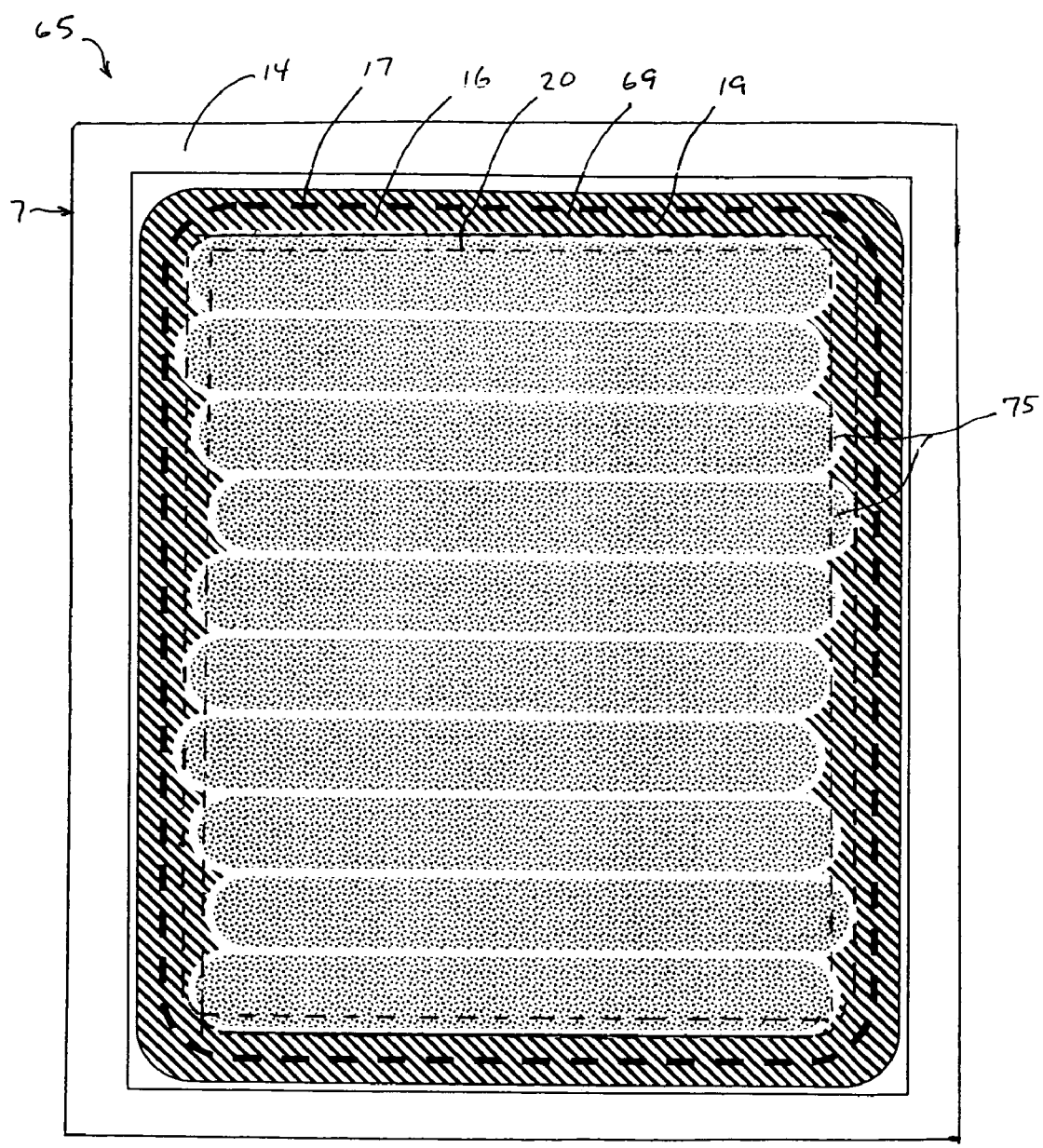
FIG. 21 is another variation of the second embodiment of the invention, illustrating the use of offset electrodes with rounded ends to further reduce stress in the mounting.

FIG. 21 illustrates a variation of the FIG. 20 of the concept of the invention. Here, while the aforementioned electrode layers 27, 29 31 and 33 are again extended over the right angled corner 20 of the frame 7 toward the seal 17, the ends 75 of the electrode cells are both rounded and staggered with respect to each other, thereby further relieving tensile stresses that can be generated by the flexing of the electrolyte sheet assembly 3 toward and away from the inner edge 20 of the fuel frame 7.

Figure 22:
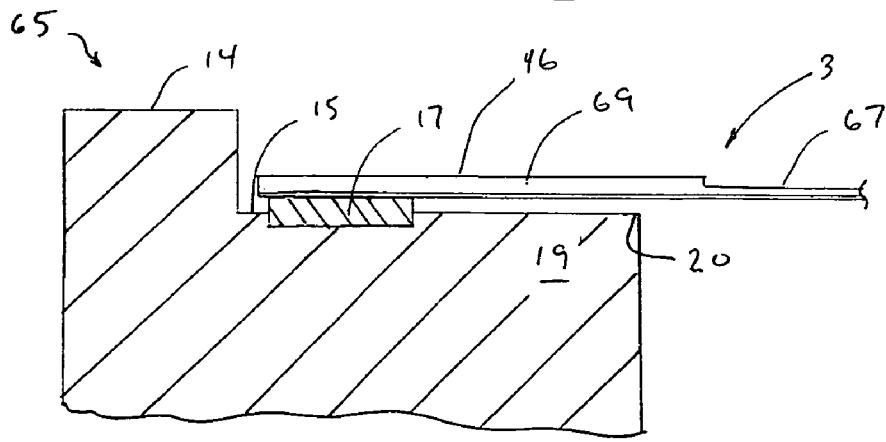
FIG. 22 illustrates how the second embodiment of the invention may be applied to single cell electrolyte sheet assemblies.

FIG. 22 illustrates how the second embodiment of the invention may be applied to a single cell type electrolyte sheet assembly 3. In the prior art, the peripheral portion 16 is often at least 75% as thick as the central portion 67 of the sheet 35. Accordingly, when a thickened portion 69 is provided over the peripheral portion 16, the sheet 3 is at least the same thickness, and preferably formed thicker than its central portion 67. The thickened portion 69 is preferably formed by simply thickening the anode layer of such a single cell electrolyte sheet 3, which normally forms the supporting layer of the entire sheet 3.

FIGS. 23A and 23B illustrate how the thickening of the peripheral portion 16 in a multi-cell electrolyte sheet assembly 3 having central axes A and B advantageously disperses tensile stresses throughout the central portion 67 of the electrolyte sheet assembly 3, and further avoids the concentration of potentially damaging tensile stresses at the peripheral portion 16 of the electrolyte sheet assembly 3, and the inner edge 19 of the fuel frame 7.

While this invention has been described with respect to two embodiments and several variations thereof, it will become apparent to persons skilled in the art that various modifications and additions may be made to these embodiments. All such variations, additions and modifications are intended to fall within the scope of this invention, which is limited only by the appended claims and equivalents thereto.

What is claimed is:

1. A stress reducing mounting in a solid electrolyte fuel cell for an electrolyte sheet assembly of a type less than 200 microns in thickness that includes a flexible sheet of ceramic material whose periphery forms a peripheral portion of the electrolyte sheet, comprising:
   a support assembly having an inner edge portion that supports said peripheral portion of said electrolyte sheet;
   a seal that secures an edge of said peripheral portion of said electrolyte sheet to said support assembly, and
   a stress reducer located on one or the other of said peripheral portion of said electrolyte sheet and said support assembly inner edge portion that reduces tensile stress in the flexible ceramic sheet forming said peripheral portion caused by a bending of said peripheral portion of said electrolyte sheet adjacent to said inner edge portion, wherein said stress reducer is at least one of a convex curved surface on said inner edge portion of said support assembly that makes area contact with said peripheral portion when said peripheral portion bends over said inner edge portion, and a stiffening structure on said sheet peripheral portion that renders said ceramic sheet material forming said peripheral portion more resistant to bending and wherein said electrolyte sheet assembly includes a supporting sheet of ceramic material that is thinner than an electrode portion of said electrolyte sheet, and that forms said peripheral portion, and said stiffening structure includes a thickening of said ceramic material forming said peripheral portion such that the thickness of said periphery of said ceramic sheet approaches or equals the thickness of an electrode portion of said electrolyte sheet assembly.

2. A stress reducing mounting in a solid electrolyte fuel cell for an electrolyte sheet assembly of a type less than 200 microns in thickness that includes a flexible sheet of ceramic material whose periphery forms a peripheral portion of the electrolyte sheet, comprising:
   a support assembly having an inner edge portion that supports said peripheral portion of said electrolyte sheet;
   a seal that secures an edge of said peripheral portion of said electrolyte sheet to said support assembly, and
   a stress reducer located on one or the other of said peripheral portion of said electrolyte sheet and said support assembly inner edge portion that reduces tensile stress in the flexible ceramic sheet forming said peripheral portion caused by a bending of said peripheral portion of said electrolyte sheet adjacent to said inner edge portion, wherein said stress reducer is at least one of a convex curved surface on said inner edge portion of said support assembly that makes area contact with said peripheral portion when said peripheral portion bends over said inner edge portion, and a stiffening structure on said sheet peripheral portion that renders said ceramic sheet material forming said peripheral portion more resistant to bending, wherein said electrolyte sheet assembly is of substantially the same thickness from its central portion to its edges, and said stiffening structure includes a thickening of its peripheral portion beyond the thickness of its central portion.

3. A stress reducing mounting in a solid electrolyte fuel cell for an electrolyte sheet assembly of a type less than 200 microns in thickness that includes a flexible sheet of ceramic material whose periphery forms a peripheral portion of the electrolyte sheet, comprising:
   a support assembly having an inner edge portion that supports said peripheral portion of said electrolyte sheet;
   a seal that secures an edge of said peripheral portion of said electrolyte sheet to said support assembly, and
   a stress reducer located on one or the other of said peripheral portion of said electrolyte sheet and said support assembly inner edge portion that reduces tensile stress in the flexible ceramic sheet forming said peripheral portion caused by a bending of said peripheral portion of said electrolyte sheet adjacent to said inner edge portion, wherein said stress reducer is at least one of a convex curved surface on said inner edge portion of said support assembly that makes area contact with said peripheral portion when said peripheral portion bends over said inner edge portion, and a stiffening structure on said sheet peripheral portion that renders said ceramic sheet material forming said peripheral portion more resistant to bending, wherein said stiffening structure includes a thickening of said peripheral portion with one or both of a ceramic and metallic material that is different from the ceramic material forming the periphery of the electrolyte sheet assembly.

4. The stress reducing mounting of claim 3, wherein said stiffening structure are integrally formed ceramic ribs.

5. The stress reducing mounting of claim 3, wherein said stiffening structure are corrugations.

6. The stress reducing mounting of claim 2, wherein said layer of metal is an extension of electrodes on said ceramic sheet material.

7. The stress reducing mounting of claim 2, wherein said thickening of said peripheral portion does not extend completely to an edge of said peripheral portion.

8. The stress reducing mounting of claim 6, wherein end portions of said electrodes are rounded.

9. The stress reducing mounting of claim 8, wherein said rounded ends of said electrodes are offset from one another.

10. The stress reducing mounting of claim 7, wherein said thickening of said peripheral portion ends about 2 mm from edges of said peripheral portion.

11. The stress reducing mounting of claim 2, wherein said thickness of said periphery of said ceramic sheet is between about 15 and 25 microns, and said thickness of non-peripheral portion of said electrolyte sheet is between about 30 and 100 microns.

12. The stress reducing mounting of claim 2, wherein said thickening of said peripheral portion increases toward an edge of said peripheral portion from a central axis of said electrolyte sheet assembly.

* * * * *